(12) United States Patent
Zoll et al.

(10) Patent No.: US 11,072,130 B2
(45) Date of Patent: Jul. 27, 2021

(54) HAND-GUIDED DEVICE FOR SETTING A SETTING ELEMENT AND METHOD FOR USING SAID DEVICE

(71) Applicant: WEBER SCHRAUBAUTOMATEN GmbH, Wolfratshausen (DE)

(72) Inventors: Reinhard Zoll, Munich (DE); Ralf Wiethoff, Weilheim (DE); Jochen Hartmann, Lenggries (DE)

(73) Assignee: Weber Schraubautomaten GmbH

( * ) Notice: Subject to any disclaimer, the term of this patent is extended or adjusted under 35 U.S.C. 154(b) by 562 days.

(21) Appl. No.: 15/739,040

(22) PCT Filed: Jun. 21, 2016

(86) PCT No.: PCT/EP2016/064289
§ 371 (c)(1),
(2) Date: Dec. 21, 2017

(87) PCT Pub. No.: WO2016/207150
PCT Pub. Date: Dec. 29, 2016

(65) Prior Publication Data
US 2018/0186088 A1 Jul. 5, 2018

(30) Foreign Application Priority Data
Jun. 23, 2015 (DE) .................... 10 2015 110 081.9

(51) Int. Cl.
*B25B 31/00* (2006.01)
*B29C 65/00* (2006.01)
(Continued)

(52) U.S. Cl.
CPC ........ *B29C 66/92431* (2013.01); *B23K 20/12* (2013.01); *B25B 31/00* (2013.01);
(Continued)

(58) Field of Classification Search
CPC ........... Y10T 29/5377; Y10T 29/53796; Y10T 29/53839; B29C 65/56; B29C 65/565;
(Continued)

(56) References Cited

U.S. PATENT DOCUMENTS

| 1,656,301 | A | * | 1/1928 | Stevens ................ B25D 17/043 |
|---|---|---|---|---|
| | | | | 173/162.2 |
| 4,657,626 | A | | 4/1987 | Cearlock et al. |
| 5,833,127 | A | | 11/1998 | Powell et al. |
| 6,341,542 | B1 | * | 1/2002 | Ade ...................... B23P 19/006 |
| | | | | 81/433 |
| 2001/0052418 | A1 | | 12/2001 | Wissmach et al. |

FOREIGN PATENT DOCUMENTS

| CN | 1328893 A | 1/2002 |
|---|---|---|
| DE | 29614419 U1 | 10/1996 |

(Continued)

OTHER PUBLICATIONS

Translation of GB 236910A (Year: 1925).*
(Continued)

*Primary Examiner* — Tyrone V Hall, Jr.
*Assistant Examiner* — Abbie E Quann
(74) *Attorney, Agent, or Firm* — Dickinson Wright PLLC

(57) ABSTRACT

The invention relates to a hand-guided device (10) for setting a setting element (12) in a component. The device comprises a handle (14) for holding the device, a carriage (34), which can be moved in relation to the handle and which bears a rotatably supported drive shaft (46), at one end of which a holder for the setting element is formed, a force accumulator (44), which is arranged between the handle and the carriage and which serves to store a defined advancing force, with which the force limiter can be loaded by means of a relative motion between the handle and the carriage, and a force limiter (64) for limiting the advancing force stored in the force accumulator. The force accumulator is designed to apply the stored advancing force to the setting element by means of the carriage. The invention further relates to a (Continued)

Figure 1:
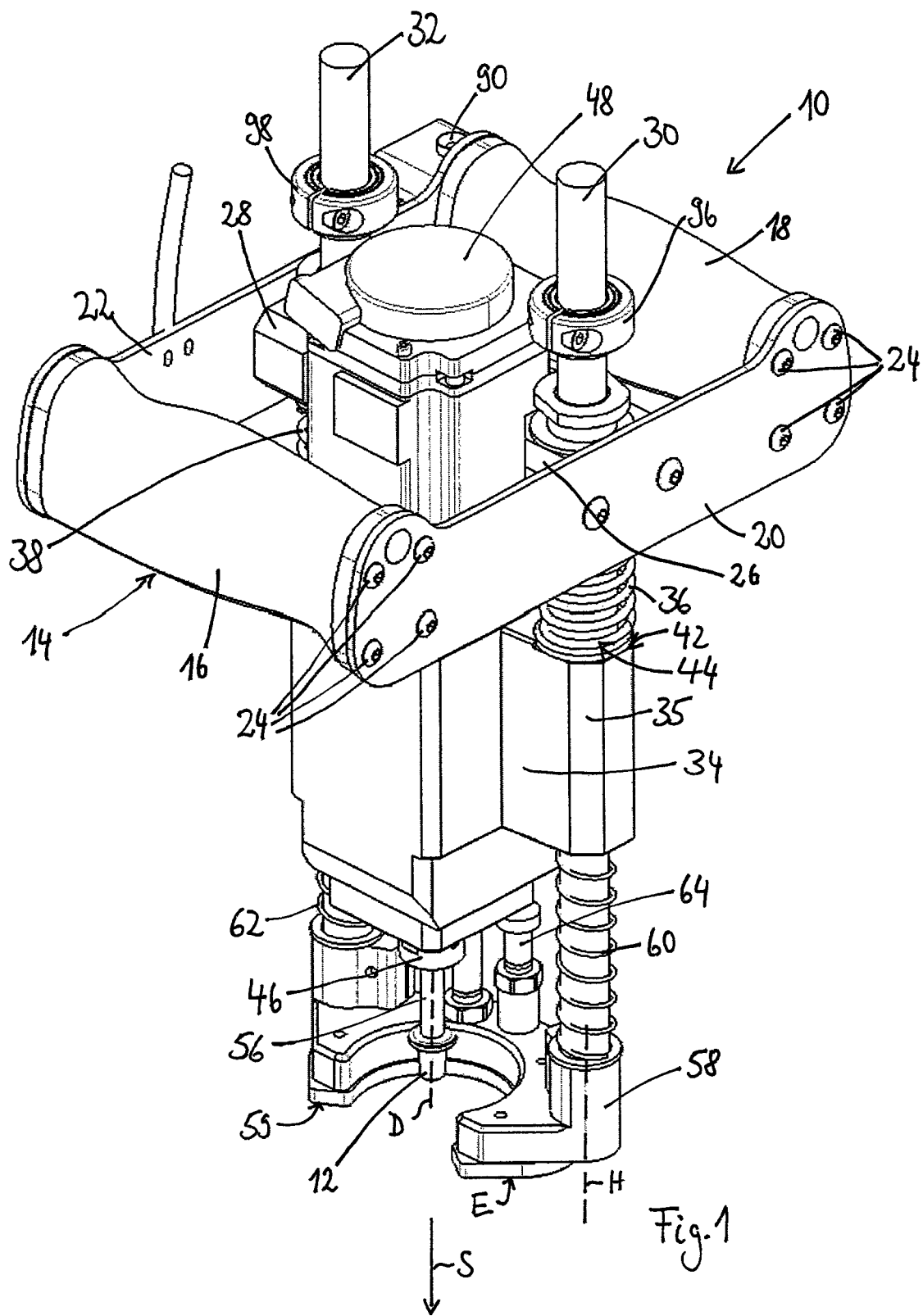

method for manually setting a setting element by means of said device.

12 Claims, 6 Drawing Sheets

(51) Int. Cl.
*B29C 65/06* (2006.01)
*B23K 20/12* (2006.01)

(52) U.S. Cl.
CPC ...... *B29C 65/0672* (2013.01); *B29C 65/0681* (2013.01); *B29C 66/73116* (2013.01); *B29C 66/8161* (2013.01); *B29C 66/8322* (2013.01); *B29C 66/861* (2013.01); *B29C 66/92653* (2013.01); *B29C 66/474* (2013.01); *B29C 66/532* (2013.01)

(58) Field of Classification Search
CPC ......... B29C 65/60; B25B 27/02; B25B 31/00; F16B 19/04; B25D 11/00; B25D 11/02; B25D 17/04; B25D 17/043
See application file for complete search history.

(56) References Cited

FOREIGN PATENT DOCUMENTS

| | | | |
|---|---|---|---|
| DE | 102004034498 A1 | 2/2006 | |
| EP | 1577076 A2 | 9/2005 | |
| GB | 236910 A * | 11/1925 | ........... B25D 17/043 |
| JP | 56102390 A | 8/1981 | |
| JP | S63214425 A | 9/1988 | |
| JP | 3032579 A | 2/1991 | |
| JP | 2002059306 A | 2/2002 | |

OTHER PUBLICATIONS

Communication from German Patent Office for related German Patent No. 10 2015 110 081.9; dated May 2, 2016; 9 pages.
International Preliminary Report on Patentability for related International Application No. PCT/EP2016/064289; dated Jun. 21, 2016; 9 pages.
International Search Report for related International Application No. PCT/EP2016/064289; dated Sep. 22, 2016; 6 pages.
Official Letter from Japanese Patent Office.

* cited by examiner

HAND-GUIDED DEVICE FOR SETTING A SETTING ELEMENT AND METHOD FOR USING SAID DEVICE

CROSS-REFERENCES TO RELATED APPLICATIONS

This patent application is a 371 of International Application No. PCT/EP2016/064289, filed Jun. 21, 2016 which claims the priority of German Application No. 102015110081.9, filed Jun. 23, 2015 each of which is incorporated herein by reference in its entirety.

The invention relates to a hand-guided apparatus for setting a setting element in a component while generating a friction welding connection between the setting element and the component.

A stationary, fully automated apparatus for setting setting elements is known from the prior art. It is typically attached to a robot arm and is fully automatically controlled by computer. Such an apparatus comprises a rotary feed unit by which the setting element is settable into a rotation about an axis of rotation and by which a feed force acting in the direction of the axis of rotation can simultaneously be exerted onto the setting element. If the purchase of such a fully automatic apparatus, for example in workshops, is too expensive or if such a stationary apparatus is down, for example due to maintenance work, there is a need to at least temporarily take over the setting of setting elements by hand. In principle, commercial drilling machines could be used for this purpose, with the required rotation of the setting element being generated by the drilling machine and the feed force being generated by the muscular strength of the respective user.

Since the applied feed force depends on the user in this case, it is, however, not possible by means of commercial drilling machines to ensure a feed force, i.e. a reproducible feed of the setting element, that is constant over a plurality of setting processes, which ultimately produces process results of different quality.

It is the underlying object of the invention to provide an apparatus that enables a setting procedure of reproducible quality that can be carried out manually.

The object is satisfied by an apparatus having the features of claim 1 and in particular in that the apparatus has a force accumulator that is connected between a handle and a carriage and that serves for storing a defined feed force with which the force accumulator can be loaded by a relative movement between the handle and the carriage; in that the apparatus furthermore has a force limiter for limiting the feed force stored in the force accumulator; and in that the force accumulator is configured to exert the stored feed force onto the setting element via the carriage.

It is the underlying idea of the invention to decouple the feed force exerted onto the setting element from a force applied by the user, i.e. not to use the user force directly as the feed force, but rather instead to use it to load a force accumulator and ultimately to apply the feed force for the setting element by means of the force accumulator. In this respect, the load of the force accumulator is limited so that—under the requirement that the user has applied a minimal force for the complete loading of the force accumulator—a constantly reproducible feed force is applied by the force accumulator onto the carriage and onto the setting element coupled thereto. Ultimately, a reproducible feed force progression can thus be generated substantially independently of the force applied by the user and thus a permanently good and in particular reproducible quality of the setting result can be ensured.

Advantageous embodiments of the invention can be seen from the dependent claims, from the description and from the drawing.

The handle preferably comprises two elongate gripping elements that are arranged substantially in parallel with one another and/or at the same spacing from an axis of rotation of a drive shaft that can be equipped with the setting element. This has the advantage that the required axial force can be applied by both arms without generating a resulting torque on the apparatus in so doing.

The force accumulator can comprise a spring, for example a compression spring, or can be configured as a spring. Every other kind of force accumulator or energy device is, however, also conceivable, for example a hydraulic store, a pneumatic store, an electric store, e.g. a battery, and/or an electromechanical store.

The force limiter is formed in a particularly inexpensive embodiment which is simple to produce by two corresponding force limitation abutments. In this respect, the first force limitation abutment can be provided at a support part and the second force limitation abutment can be provided at the handle. Alternatively, the component itself can form the first force limitation abutment.

To be able to set the force applied to the carriage by the force accumulator, the first force limitation abutment and/or the second force limitation abutment can be adjustable in an axial direction, i.e. in the direction of the axis of rotation.

In accordance with an advantageous embodiment, the apparatus comprises a motor, in particular an electric motor, for driving the drive shaft. The motor is preferably arranged at the carriage. To be able to carry out the friction welding process reliably, the motor is preferably configured such that it can drive the drive shaft at a speed of rotation of more than 4000 r.p.m. To be able to stop the motor faster to achieve an ideal solidification of the melted material, the motor can be equipped with an active braking function.

The motor can generally be started manually. However, to increase the reliability and reproducibility of the setting process, a first detection means is preferably provided for detecting an activation of the force limiter, in particular a detection means for detecting a contact between a first force limitation abutment provided at a support part and a second force limitation abutment provided at the handle. In other words, the first detection means recognizes when the force accumulator is loaded to a maximum in order then to trigger an automatic start of the actual setting process. For this purpose, the first detection means can comprise a first switch that is connected to a motor, in particular to an electric motor, drive-effectively coupled to the drive shaft to switch on the motor on a detection of the activation of the force limiter.

It is furthermore advantageous for the support part to comprise a first end abutment and for the carriage to comprise a second end abutment to limit a feed movement of the carriage relative to the support part. The component could generally also itself form the first end abutment.

A second detection means is preferably provided for detecting an end position of the carriage or of the setting element. The second detection means can, for example, detect a contact between a first end abutment and a second end abutment. The first end abutment and the second end abutment are preferably arranged so that they impact one another when the desired immersion depth of the setting element has been reached.

The second detection means preferably comprises a second switch that is connected to a motor, in particular to an electric motor, drive-effectively coupled to the drive shaft to switch off the motor on a detection of the end position. The user therefore does not need to switch off the motor himself on reaching the end position.

To give the use a signal that indicates the end of a setting process, the apparatus can have a signal device for transmitting a signal. The signal is preferably displayed a few seconds after the switching off and standstill of the motor, ideally from the point in time onward at which the material of the component heated by the friction welding process has cooled down sufficiently.

The signal can be a unimodal signal, i.e. a signal addressing a single human sense, or a multimodal signal, i.e. a signal addressing a plurality of human senses. The signal can in particular be a visual signal, for example from a lamp, an acoustic signal, for example a sound, and/or a signal to be felt, for example a vibration.

To move the carriage back into a starting position after ending a setting process, a return spring can be arranged between a support part and the carriage. The carriage is hereby so-to-say supported in a floating manner between the return spring and the force accumulator. The spring stiffness of the return spring is preferably lower than the spring stiffness of the force accumulator.

The apparatus can furthermore comprise at least one linear guide at which the carriage and the handler are linearly movably guided. The apparatus advantageously comprises two guide rods which extend in parallel with one another and at which the carriage and the handle are respectively linearly movably guided.

A lamp, e.g. an LED, in particular arranged at the carriage, for illuminating a work region surrounding the mount for the setting element, is preferably provided to facilitate the setting process.

The apparatus is particularly well-suited for setting a setting element comprising a first plastic material in a component comprising a second plastic material. The melting point of the first plastic material is here preferably higher than the melting point of the second plastic material.

The invention further relates to a method for a manual setting or a hand-guided setting of a setting element in a component by means of the previously described apparatus, said method comprising the steps:
attaching the setting element to the drive shaft;
loading the force accumulator by a movement of the handle relative to the carriage up to the activation of the force limiter; and
introducing the setting element into the component while rotating the drive shaft and feeding the carriage by the force accumulator.

In this respect, the feed force only comes from the force accumulator on the introduction of the setting element, i.e. it is not directly transmitted to the carriage by the handle. The advantages described above can be achieved accordingly by the method in accordance with the invention.

The method is preferably designed such that the limiting of the loading of the force accumulator is effected by at least one force limitation abutment that in particular acts between the handle and a support part and that has two active surfaces abutting one another in the state limiting the loading.

As soon as the force accumulator has been loaded and the force limiter has been activated, a first switch can be actuated that effects a switching on of a motor, in particular of an electric motor, for driving the drive shaft and that thus starts the actual setting process. It is generally possible to actuate the first switch manually. An automatic actuation of the first switch is, however, preferred to increase the reliability and the reproducibility of the setting process. It can, for example, be triggered by a first detection means that detects a contact between a first force limitation abutment provided at a support part and a second force limitation abutment provided at the handle.

When the carriage has reached an end position, the switching off of a motor for driving the drive shaft is preferably initiated by an automatic actuation of a second switch. The end position of the carriage here advantageously corresponds to the end position of the setting element in the component.

Subsequently and after a cooling down phase of the component and of the setting element of less than 10 seconds, in particular of 1 to 3 seconds, measured from the point in time onward at which the setting element and the motor no longer rotate, a signal device can transmit a unimodal or multimodal signal to signalize that the setting process has ended.

To shorten the running down of the motor and thus the total time of the setting process, the motor can be actively braked after it has been switched off.

The method is also particularly well suited to setting a setting element comprising a first plastic material in a component comprising a second plastic material, wherein the melting point of the first plastic material should preferably be higher than the melting point of the second plastic material.

Figure 2:
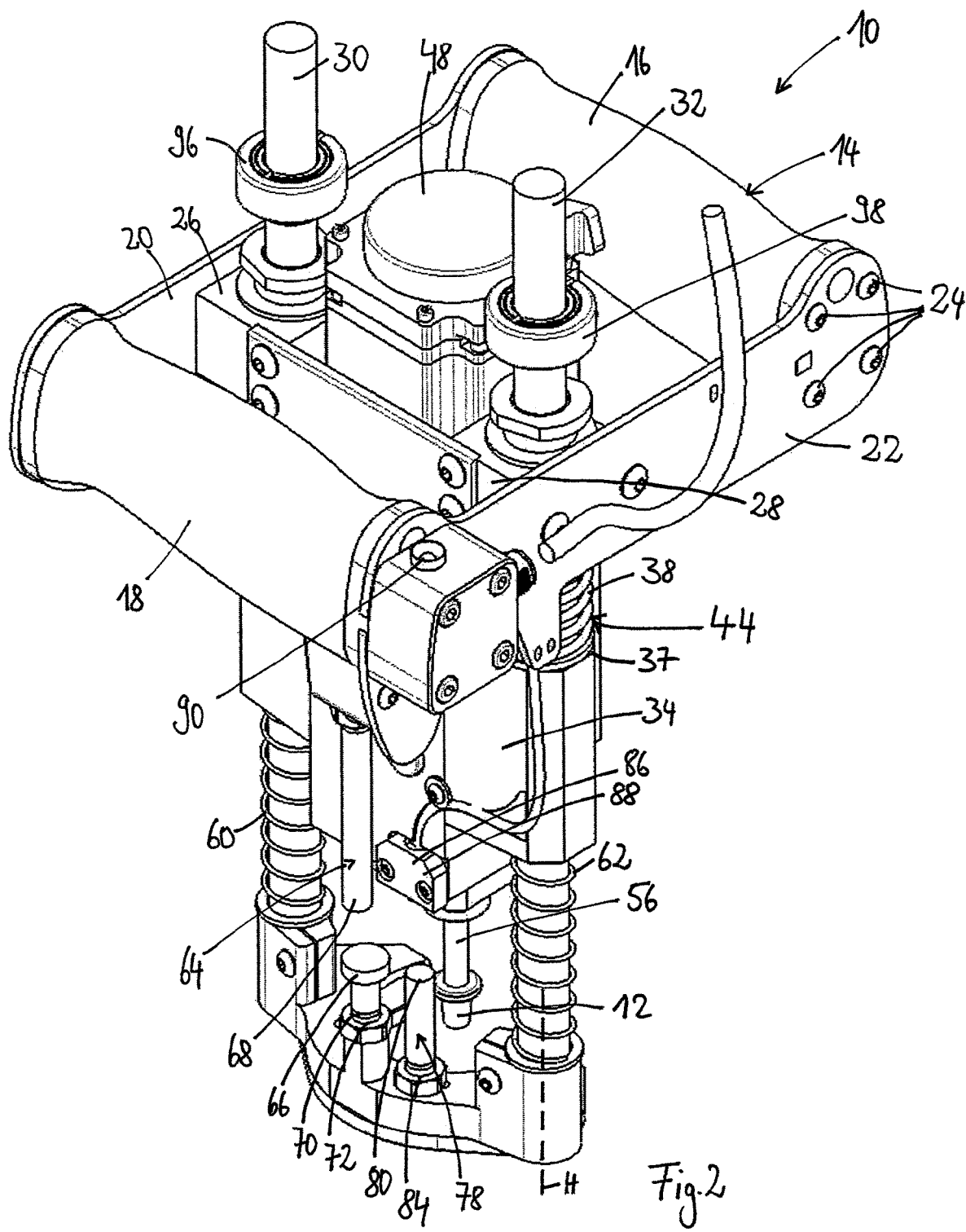
Figure 3:
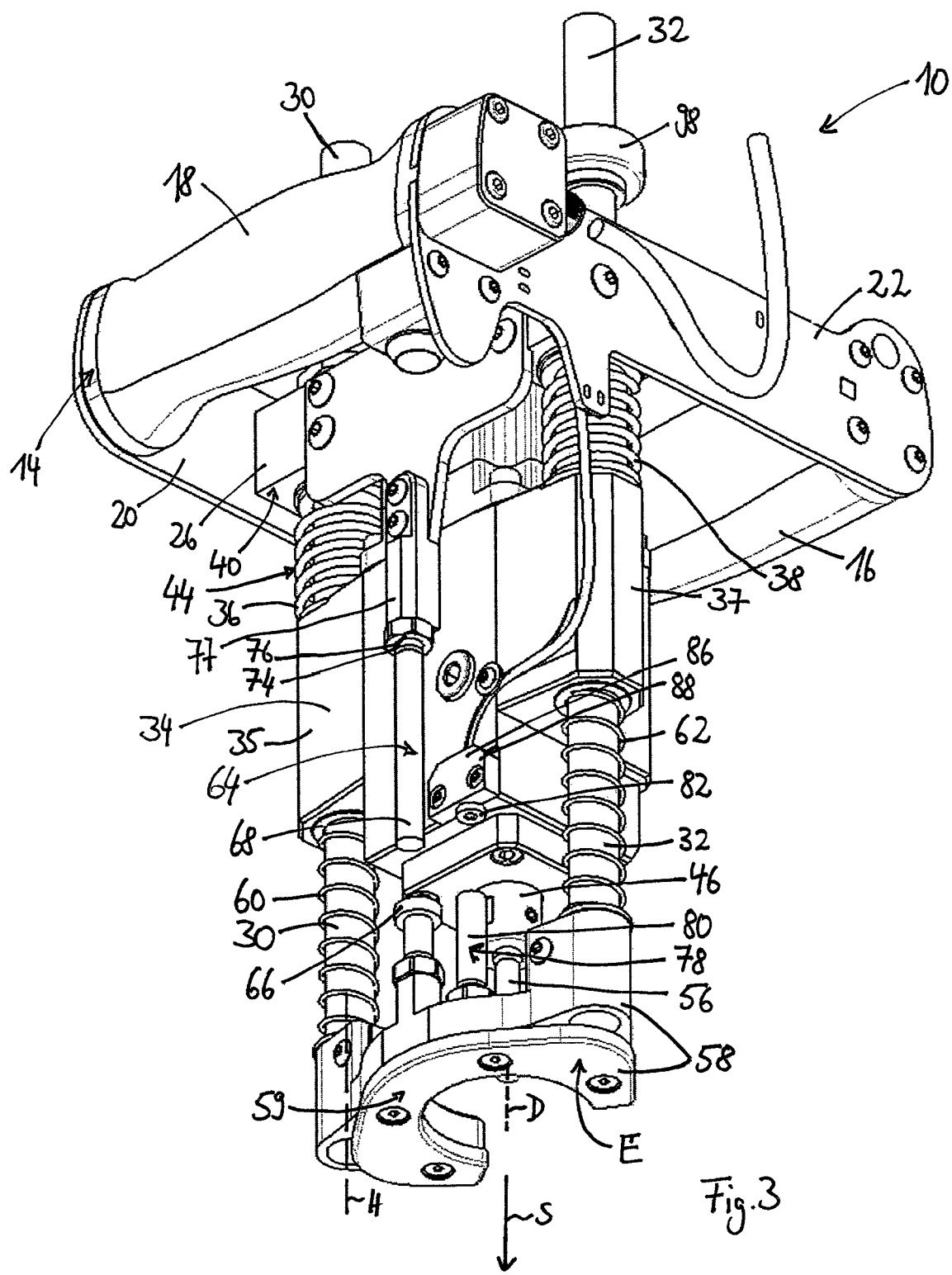
Figure 4:
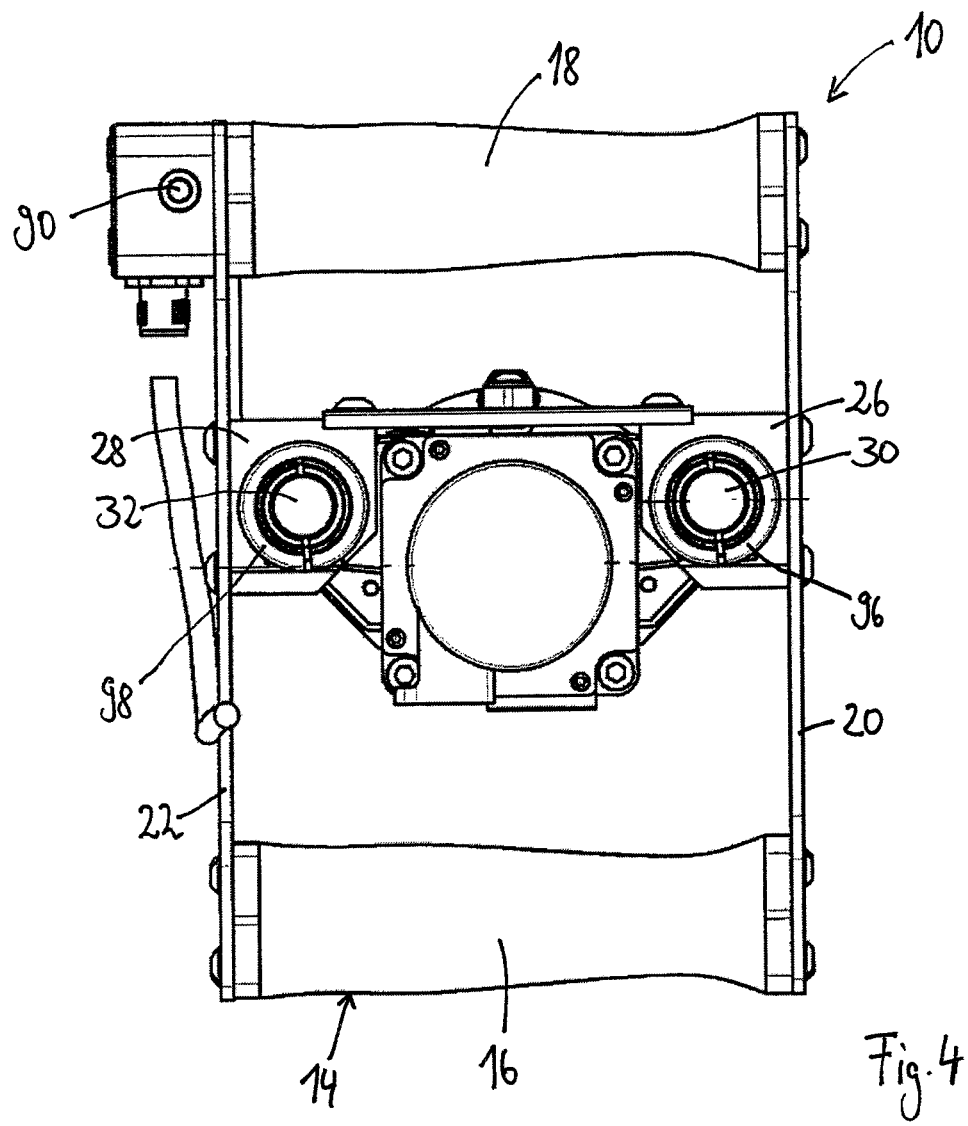
Figure 5:
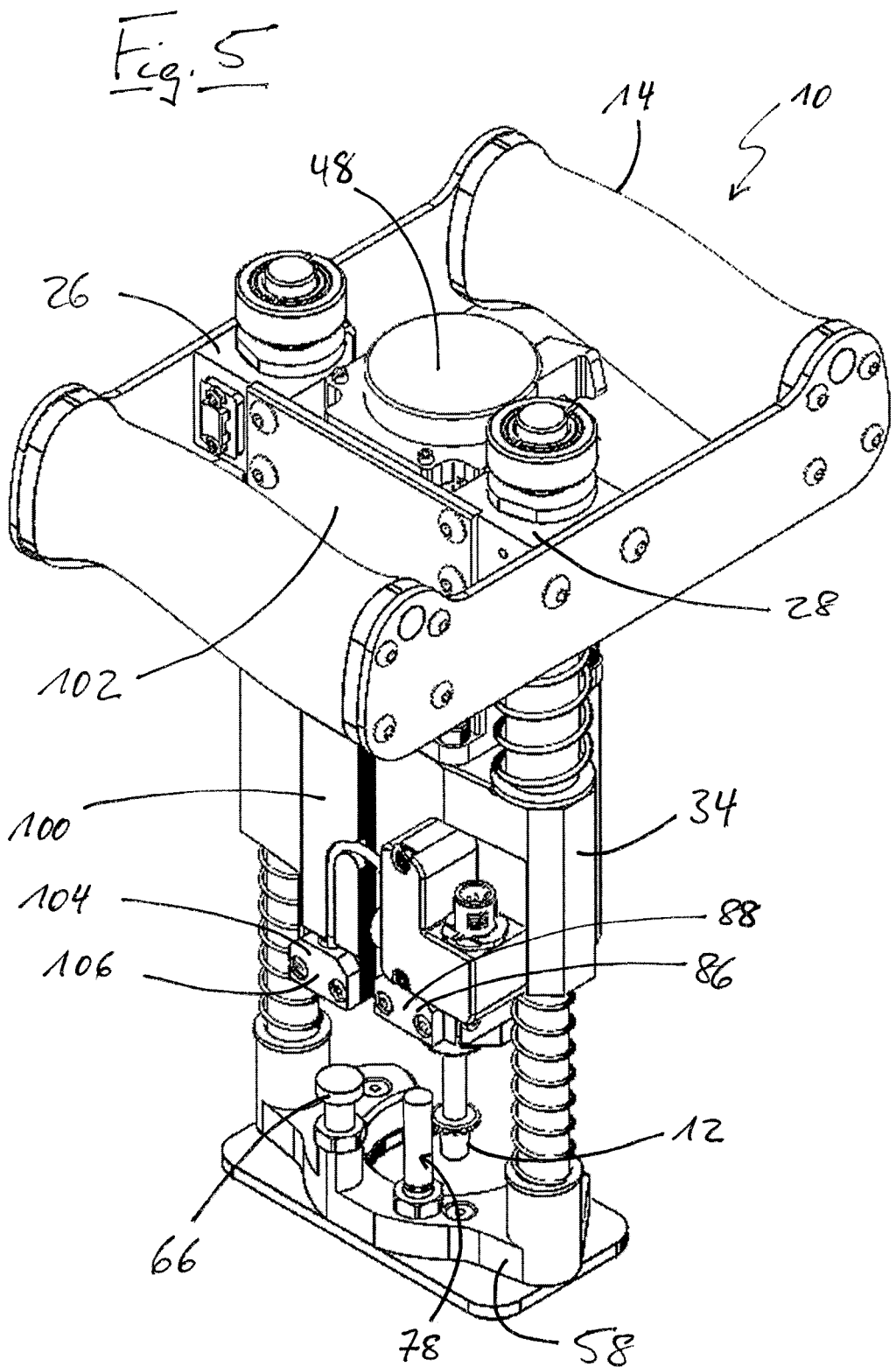
Figure 6:
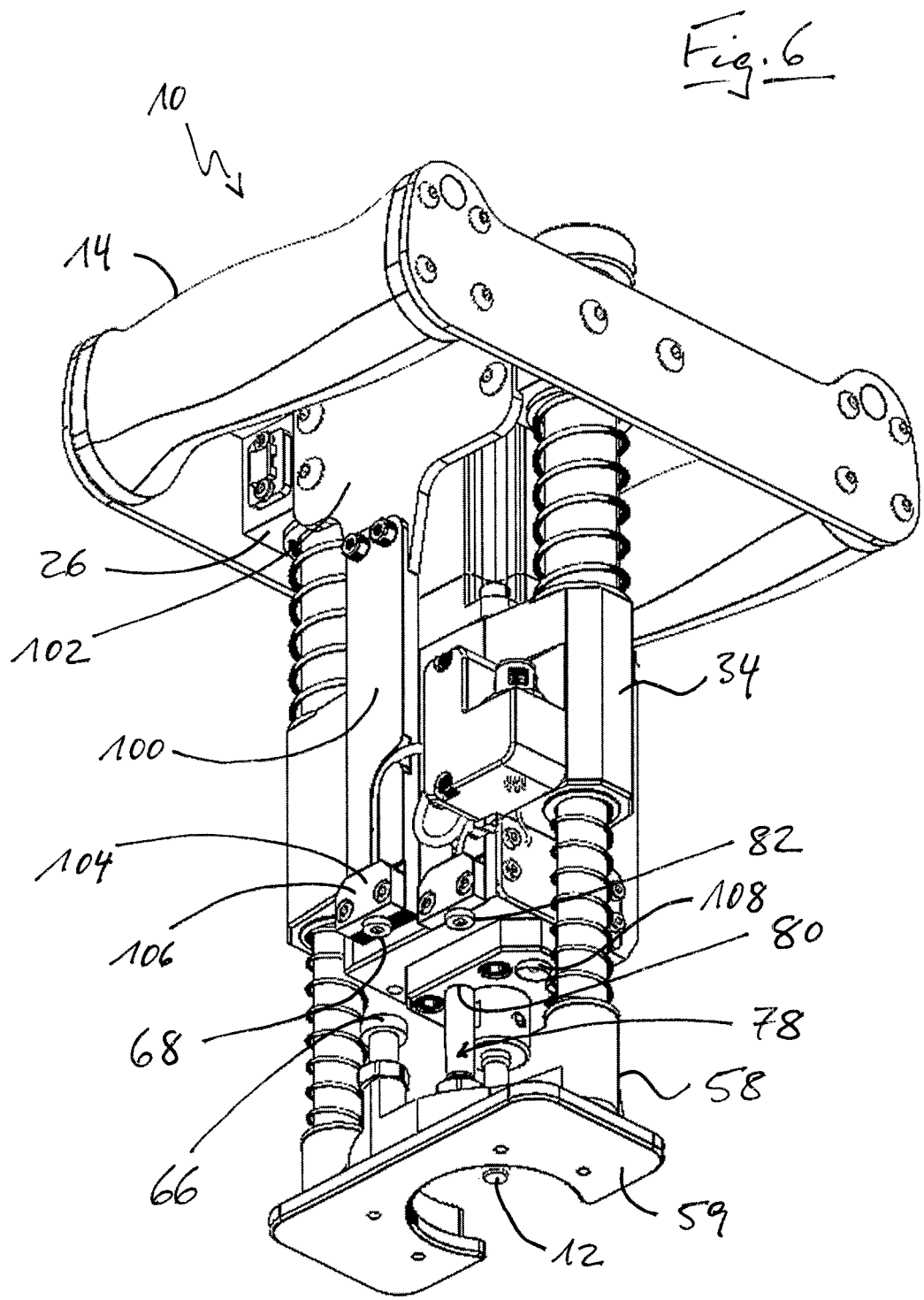

The invention will be described in the following using purely exemplary embodiments and with reference to the enclosed drawings. There are shown:

FIG. 1 a first perspective view of an apparatus in accordance with the invention in accordance with a first embodiment;

FIG. 2 a second perspective representation of the apparatus of FIG. 1;

FIG. 3 a third perspective representation of the apparatus of FIG. 1; and FIG. 4 a plan view of the apparatus of FIG. 1;

FIG. 5 a first perspective view of an apparatus in accordance with the invention in accordance with a second embodiment; and FIG. 6 a second perspective representation of the apparatus of FIG. 5.

FIGS. 1 to 4 and 5 to 6 each show an apparatus 10 for a hand-guided setting of a setting element 12 in a component, not shown.

The apparatus 10 shown in FIGS. 1 to 4 (first embodiment) comprises a handle 14 having two elongate gripping elements 16, 18 that are connected to one another by means of connection pieces 20, 22 at their ends. The connection pieces 20, 22 are designed in the form of metal sheets and are releasably connected to the gripping elements 16, 18 by means of screws 24. The gripping elements 16, 18 each extend substantially at right angles to the metal sheets 20, 22 so that the gripping elements 16, 18 and the metal sheets 20, 22 form a rectangle. First bearings 26, 28 in which two guide rods 30, 32 that are arranged in parallel with one another and that are displaceably supported are arranged at the metal sheets 20, 22.

The handle 14 can be gripped around with both hands by a user, not shown, at the gripping elements 16, 18 to raise the apparatus 10 and to press it against the component. As can in particular be seen in FIG. 4, the gripping elements 16, 18 are ergonomically adapted to the hand with respect to their diameter and are correspondingly tapered in a region at which the user is to place his index finger and thumb.

The apparatus 10 furthermore comprises a carriage 34 that is likewise displaceably supported at the guide rods 30, 32 by means of second bearings 35, 37. A respective compression spring 36, 38 is arranged around each guide rod 30, 32 between the first bearings 26, 28 and the second bearings 35, 37. Each compression spring 36, 38 is connected between a first force transmission surface 40, see FIG. 3, at the first bearing 26 and a second force transmission surface 42, see FIG. 1, at the carriage 34. The first force transmission surface 40 and the second force transmission surface 42 extend substantially at right angles to a main axis H of the guide rods 30, 32 and arranged in parallel with one another and opposite one another. The compression springs 36, 38 serve as force accumulators 44 and are configured to transmit a force applied onto the handle 14 by the user onto the carriage 34.

A drive shaft 46 is rotatably arranged at the carriage 34 and is drive-effectively connected to an electric motor 48 for driving the drive shaft 46. The electric motor 48 is configured such that the drive shaft 46 can be brought to a rotational speed of at least 4000 r.p.m. and can be actively braked from there to 0 r.p.m. At the end of the drive shaft 46 remote from the electric motor 48, a bit 56 for receiving the setting element 12 is provided.

The apparatus 10 further comprises a support part 58 having a contact surface 59 which is shaped in the form of an annular section and by which the apparatus 10 can be placed at the component, not shown. As can be seen in FIG. 3, the contact surface 59 extends in the form of an annular section over an angle of more than 180° about a point of intersection between a contact plane E defined by the contact surface 59 and an axis of rotation of the drive shaft 46. The support part 58 is connected to both guide rods 30, 32 and thus forms a connection between the two guide rods 30, 32. Return springs 60, 62 that are connected between the support part 58 and the carriage 34 serve to hold the carriage 34 in a starting position remote from the support part 58. The spring stiffness of the return springs 60, 62 is selected as smaller than that of the compression springs 36, 38 so that, on a movement of the handle 14 in the direction of the support part 58, the return springs 60, 62 are compressed first and only then the compression springs 36, 38.

A force limiter 64 is arranged between the handle 14 and the support part 58 and is configured in the form of a first force limitation abutment 66 and a second force limitation abutment 68. The force limitation abutments 66, 68 are arranged with respect to one another such that their front faces abut one another on a movement of the handle 14 guided by the guide rods 30, 32 in the direction of the support part 58. The first force limitation abutment 68 has, as can be seen in FIG. 2, an external thread 70 in the form of a fine thread that corresponds with an internal thread 72 of the support part 58. In addition, as can be seen in FIG. 3, the second force limitation abutment 68 is equipped with an external thread 74 in the form of a fine thread which corresponds with an internal thread 76 of a part associated with the handle 14. It is hereby possible in a simple manner to adjust the first force limitation abutment 66 and the second force limitation abutment 68 relative to one another in an axial direction.

A feed limitation device 78, see FIG. 3, having a first end abutment 80 and a second end abutment 82 is provided between the support part 58 and the carriage 34. As can be seen in FIG. 2, the first end abutment 80 is axially adjustably attached to the support part 58 by means of a fine thread 84.

The carriage 34 has a detection means 86 that is configured to detect a contact between the first end abutment 80 and the second end abutment 82 and to transmit a signal for switching off the electric motor 48 to a switch 88. A signal device 90 in the form of a lamp to signalize the end of a setting process is arranged at the handle 14 (FIG. 2).

To prevent pulling the handle 14 from the guide rods 30, 32 against the setting direction S, a ring-shaped stopper 96, 98 is arranged around each of the guide rods 30, 32 in a region remote from the contact surface 59.

The carrying out of a procedure for setting the setting element 12 in the components by means of the previously described apparatus 10 will be explained in the following.

The apparatus 10 is first equipped with the setting element 12. The setting element 12 is here attached to the bit 56 associated with the drive shaft 46 in that it is placed onto the bit 56 at the front face with a stationary drive shaft 46.

The apparatus 10 is subsequently pressed areally against the component by the contact surface 59 at a desired point so that the contact surface 59 contacts the component in a planar manner. The return springs 50, 52 are first compressed by a movement of the handle 14 in the setting direction S along the guide rods 30, 32 until the setting element 12 abuts the component. A relative movement between the handle 14 and the carriage 34 is subsequently generated by the further movement of the handle 14 in the direction of the component, whereby the compression springs 36, 38 are compressed and the force accumulator 44 is thus loaded. The loading of the force accumulator 44 is limited in that the first force limitation abutment 66 and the second force limitation abutment 68 impact one another and a further relative movement between the handle 14 and the carriage 34 in the direction of the support part 58 is prevented. At this point of the setting process, the user presses onto the carriage 34 indirectly, namely via a handle 14 and the force accumulator 44, with a maximum force limited by the force limiter 64. The carriage 34 in turn presses the setting element 12 against the component with the maximum force stored therein. If the electric motor 48 is now started, the setting element 12 penetrates into the component after reaching the rotational speed required for melting the material of the component, with it being fed forward by the carriage 34 acted on by the force accumulator 44 while the user continues to apply just so much force to the handle 14 that the force limitation abutments 66, 68 contact one another.

The forward feed of the setting element 12 takes place up to the point in time at which the first end abutment 80 and the second end abutment 82 impact one another. On a correct setting of the end abutments 80, 82, the end position of the setting element 12 in the component is reached at this point. This is detected by the detection means 86, whereupon the electric motor 48 is switched off by means of the switch 88. To shorten the setting process and to optimize the solidification process, the electric motor 48 is actively braked from approximately 4000 r.p.m. to 0 r.p.m. after the switching off. During a cooling phase of approximately 1 to 3 seconds, measured from the point in time from which onward the electric motor has reached 0 r.p.m., the material heated by the friction welding process can cool down and solidify before it is advised by the signal device 90 that the setting process has ended and the apparatus 10 can now be removed from the setting element 12 connected to the component.

The point in time of the switching on of the electric motor 48 can be predefined by the user. If a process time is desired that is as fast as possible, the electric motor 48 can be switched on directly after the attachment of the setting element 12 to the drive shaft 46. If, however, a process is desired that is as reproducible as possible, it can be provided to delay the switching on of the electric motor 48 until the setting element 12 is pressed against the component with the maximum force stored in the loaded force accumulator 44.

When the setting process is ended and the apparatus 10 is removed from the component, the carriage 34 is pressed back into its starting position by the return springs 60, 62. The compression springs 36, 38 of the force accumulator 44 equally press the handle 14 back into its starting position.

The apparatus 10 shown in FIGS. 5 and 6 (second embodiment) largely corresponds with the first embodiment shown in FIGS. 1 to 4, with the difference that the second force limitation abutment 68 of the force limiter 64 is here formed at the end of a rigid sheet metal strip 100 at the end facing the support part 58, with the other end of said rigid sheet metal strip being fixedly connected to the handle 14, specifically via an intermediate metal sheet 102 that is attached to the first bearings 26, 28 of the carriage 34. The second force limitation abutment 68 is provided with a detection means 104 that is configured to detect a contact between the first and second force limitation abutments 66, 68, i.e. that is ultimately to detect an activation of the force limiter 64 and to transmit a signal for the automatic switching on of the electric motor 48 to a switch 106.

In a further difference from the first embodiment, the signal device 90 for signalizing the end of a setting process is not arranged at the handle 14 in the second embodiment, but rather at a side of the carriage 34 facing the support part 58, for example in the form of an LED that irradiates a light cone, e.g. a green light cone, into a work region surrounding the mount for the setting element.

In addition, a lamp 108, e.g. the form of an LED, for illuminating a work region surrounding the mount for the setting element during the setting process is arranged at the side of the carriage 34 facing the support part 58.

REFERENCE NUMERAL LIST 10 apparatus
12 setting element
14 handle
16, 18 gripping element
20, 22 connection piece
24 screws
26, 28 bearing
30, 32 guide rod
34 carriage
35, 37 bearing
36, 38 compression springs
40, 42 force transmission surface
44 force accumulator
46 drive shaft
48 electric motor
56 bit
58 support part
59 contact surface
60, 62 return spring
64 force limiter
66, 68 force limitation abutment
70, 74 external thread
72, 76 internal thread
77 part
78 feed limitation device
80, 82 end abutment
84 fine thread
86 detection means
88 switch
90 signal device
96, 98 stopper
100 sheet metal strip
102 intermediate metal sheet
104 detection means
106 switch
108 lamp
H main axis
E contact plane
D axis of rotation
S setting direction

The invention claimed is:

1. A hand-guided apparatus for setting a setting element in a component, the apparatus comprising:
a handle for holding the apparatus;
a carriage that is movable with respect to the handle and that carries a rotationally supported drive shaft at whose one end a mount for the setting element is formed;
a force accumulator which is connected between the handle and the carriage and which serves for storing a defined feed force with which the force accumulator can be loaded by a relative movement between the handle and the carriage; and a force limiter for limiting the feed force stored in the force accumulator, wherein the force accumulator is configured to exert the stored feed force onto the setting element via the carriage;
wherein the force limiter is formed by two corresponding first and second force limitation abutments; and
wherein the first force limitation abutment is provided at a support part and wherein the second force limitation abutment is provided at the handle.

2. The apparatus in accordance with claim 1, wherein the first force limitation abutment or the second force limitation abutment is adjustable in an axial direction, or both the first force limitation abutment and the second force limitation abutment are adjustable in an axial direction.

3. The apparatus in accordance with claim 1, further comprising a motor for driving the drive shaft.

4. The apparatus in accordance with claim 1, wherein the support part comprises a first end abutment and the carriage comprises a second end abutment to limit a feed movement of the carriage relative to the support part.

5. The apparatus in accordance with claim 1, further comprising a signal device for transmitting a signal to a user that indicates the end of a setting process.

6. The apparatus in accordance with claim 1, wherein a return spring is arranged between the support part and the carriage to move the carriage back into a starting position after the end of a setting process.

7. The apparatus in accordance with claim 1, further comprising at least one linear guide at which the carriage and the handle are linearly movably guided.

8. A hand-guided apparatus for setting a setting element in a component, the apparatus comprising:
a handle for holding the apparatus;
a carriage that is movable with respect to the handle and that carries a rotationally supported drive shaft at whose one end a mount for the setting element is formed;
a force accumulator which is connected between the handle and the carriage and which serves for storing a defined feed force with which the force accumulator can be loaded by a relative movement between the handle and the carriage; and a force limiter for limiting the feed force stored in the force accumulator, wherein the force accumulator is configured to exert the stored feed force onto the setting element via the carriage; and further comprising a detection means for detecting an end position of the carriage.

9. The apparatus in accordance with claim 8, wherein the detection means comprises a switch that is connected to a motor drive-effectively coupled to the drive shaft to switch off the motor on the detection of the end position.

10. A hand-guided apparatus for setting a setting element in a component, the apparatus comprising:
a handle for holding the apparatus;
a carriage that is movable with respect to the handle and that carries a rotationally supported drive shaft at whose one end a mount for the setting element is formed;
a force accumulator which is connected between the handle and the carriage and which serves for storing a defined feed force with which the force accumulator can be loaded by a relative movement between the handle and the carriage; and a force limiter for limiting the feed force stored in the force accumulator, wherein the force accumulator is configured to exert the stored feed force onto the setting element via the carriage; and further comprising a detection means for detecting an activation of the force limiter.

11. The apparatus in accordance with claim 10, wherein the detection means comprises a switch that is connected to a motor drive-effectively coupled to the drive shaft to switch on the motor on the detection of the activation of the force limiter.

12. A hand-guided apparatus for setting a setting element in a component, the apparatus comprising:
a handle for holding the apparatus;
a carriage that is movable with respect to the handle and that carries a rotationally supported drive shaft at whose one end a mount for the setting element is formed;
a force accumulator which is connected between the handle and the carriage and which serves for storing a defined feed force with which the force accumulator can be loaded by a relative movement between the handle and the carriage; and a force limiter for limiting the feed force stored in the force accumulator, wherein the force accumulator is configured to exert the stored feed force onto the setting element via the carriage; and further comprising a lamp for illuminating a work region surrounding the mount for the setting element.

* * * * *